US010007969B2

(12) United States Patent
Alberti et al.

(10) Patent No.: US 10,007,969 B2
(45) Date of Patent: Jun. 26, 2018

(54) SELECTIVELY DETERIORATE EBOOK FOR SECONDARY MARKET

(71) Applicant: INTERNATIONAL BUSINESS MACHINES CORPORATION, Armonk, NY (US)

(72) Inventors: Enrica Alberti, Rome (IT); Gianluca Mariani, Rome (IT); Riccardo Rossi, Rome (IT); Antonio Secomandi, Milan (IT); Michele Tomassi, Rome (IT); Viviana Tripodi, Rome (IT)

(73) Assignee: International Business Machines Coporation, Armonk, NY (US)

( * ) Notice: Subject to any disclaimer, the term of this patent is extended or adjusted under 35 U.S.C. 154(b) by 0 days. days.

(21) Appl. No.: 15/268,220

(22) Filed: Sep. 16, 2016

(65) Prior Publication Data
US 2018/0082403 A1 Mar. 22, 2018

(51) Int. Cl.
G09G 5/00 (2006.01)
G06T 5/00 (2006.01)
G06Q 30/02 (2012.01)
G06T 11/00 (2006.01)
G06T 11/60 (2006.01)
G06F 3/0483 (2013.01)

(52) U.S. Cl.
CPC ............ *G06T 5/00* (2013.01); *G06Q 30/0283* (2013.01); *G06T 11/001* (2013.01); *G06T 11/60* (2013.01); *G06F 3/0483* (2013.01); *G06F 2203/04806* (2013.01); *G06T 2207/20024* (2013.01); *G06T 2210/64* (2013.01)

(58) Field of Classification Search
CPC ......... G06T 5/00; G06T 11/001; G06T 11/60; G06F 2206/1512; G06F 21/00; G06F 21/10; G06F 21/16; G06Q 30/0283; G10H 2230/015
See application file for complete search history.

(56) References Cited

U.S. PATENT DOCUMENTS

| 8,359,246 | B2* | 1/2013 | Buchheit ................ G06Q 20/12 705/26.1 |
| 8,364,595 | B1 | 1/2013 | Ringewald |
| 9,141,768 | B2 | 9/2015 | Seong et al. |
| 9,454,756 | B2* | 9/2016 | Toh .................... G06Q 20/1235 |
| 9,501,792 | B2* | 11/2016 | Wu ....................... G06F 17/212 |
| 2013/0104017 | A1 | 4/2013 | Ko et al. |
| 2013/0219321 | A1 | 8/2013 | Cranfill et al. |
| 2014/0139567 | A1* | 5/2014 | Jeon ........................ G09G 5/10 345/691 |

* cited by examiner

*Primary Examiner* — Antonio A Caschera
(74) *Attorney, Agent, or Firm* — Tutunjian & Bitetto, P.C.; Scott Dobson

(57) ABSTRACT

A method, an eBook, and an apparatus. The method includes calculating, by a processor, a usage metric describing a timing at which an eBook has been displayed for viewing by a user. The method further includes selectively deteriorating, by the processor, a look of the eBook for a secondary market based on the usage metric of the eBook.

20 Claims, 10 Drawing Sheets

SELECTIVELY DETERIORATE EBOOK FOR SECONDARY MARKET

BACKGROUND

Technical Field

The present invention relates generally to eBooks and, in particular, to selectively deteriorating eBooks for the secondary market.

Description of the Related Art

Amazon® patented a way to sell "used" eBooks, whereby the original owner of a digital book can transfer the rights to use that eBook to another person permanently. Of course, the seller will lose his right to read the eBook. The transferred copy of the eBook is a perfect copy of the original. Thus, it is not really "used" and instead appears to be digitally "new". This creates a problem regarding how to determine the price of this "used" copy of an eBook that is indistinguishable from a brand new copy of that eBook. Amazon® solved this by limiting the number of times the eBook rights can be transferred. However, other methods are needed for implementing pricing for the secondary market.

SUMMARY

According to an aspect of the present principles, a method is provided. The method includes calculating, by a processor, a usage metric describing a timing at which an eBook has been displayed for viewing by a user. The method further includes selectively deteriorating, by the processor, a look of the eBook for a secondary market based on the usage metric of the eBook.

According to another aspect of the present principles, an eBook is provided. The eBook includes a processor, a memory, and a display. The processor is configured to calculate a usage metric describing a timing at which the eBook has been displayed for viewing by a user. The processor is further configured to selectively deteriorate a look of the eBook for a secondary market based on the usage metric of the eBook.

According to yet another aspect of the present principles, an apparatus is provided. The apparatus includes a communication device configured to communicate with an eBook. The apparatus further includes a processor, configured to calculate a usage metric describing a timing at which the eBook has been displayed for viewing by a user. The processor is further configured to selectively deteriorate a look of the eBook for a secondary market based on the usage metric of the eBook.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present invention is directed to selectively deteriorating eBooks for the secondary market.

We are proposing here a method and system to define and store, into the digital media, an eBook "level of usage" indicator, dependent on a set of factors that can include, but are not limited to, the following: the number of times the eBook has been read; the number of times the eBook rights can be transferred; how many bookmarks have been used; how much time each page has been opened; how much sun light was the eBook exposed to; what is the time of the day when the book is read; and so forth.

This indicator is used to make the "used" copy of the eBook less attractive against the "new" copy and to decide the right price of a "used" copy based on the degree of usage.

Figure 1:
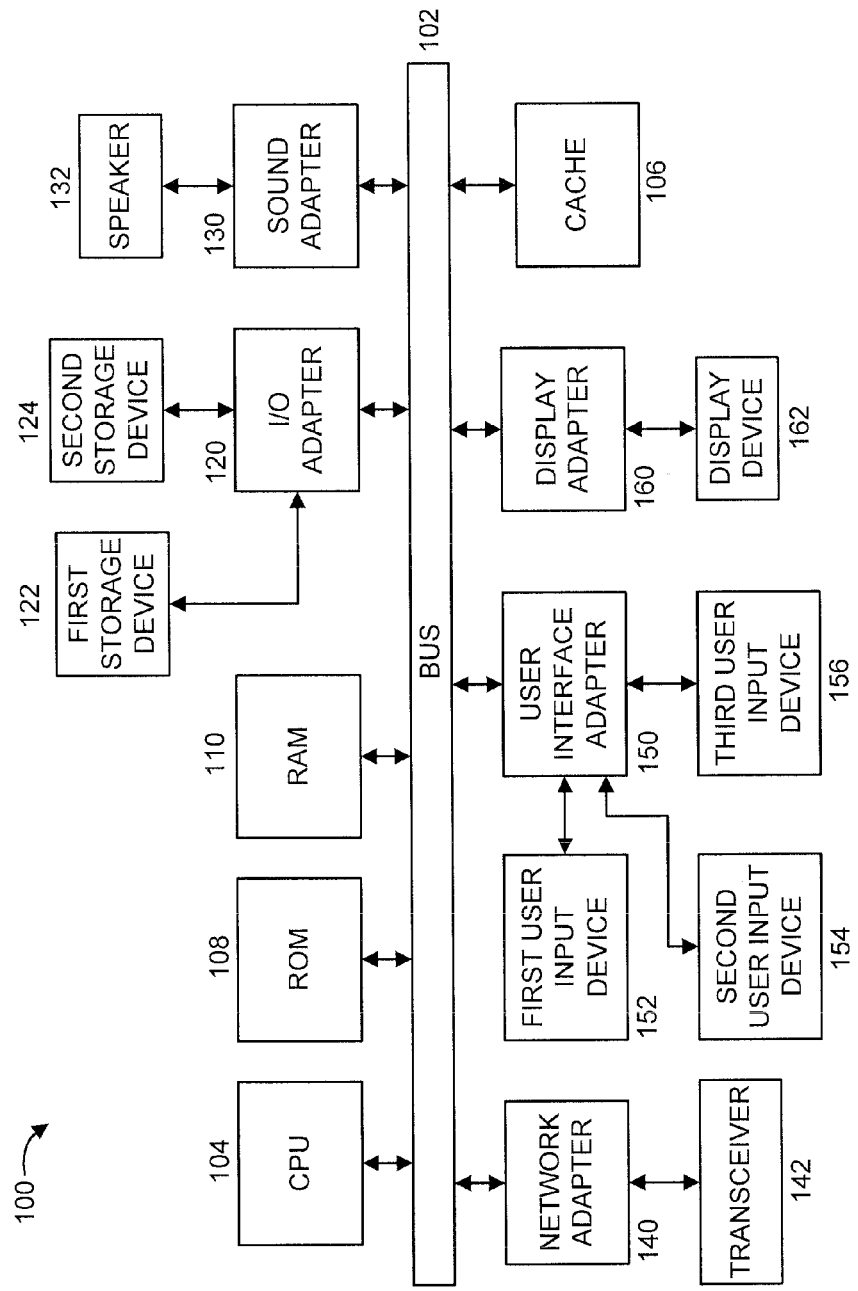
FIG. 1 shows an exemplary processing system to which the present invention may be applied, in accordance with an embodiment of the present invention.

FIG. 1 shows an exemplary processing system 100 to which the present invention may be applied, in accordance with an embodiment of the present invention. The processing system 100 can form an eBook or be used to view an eBook.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention.

The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
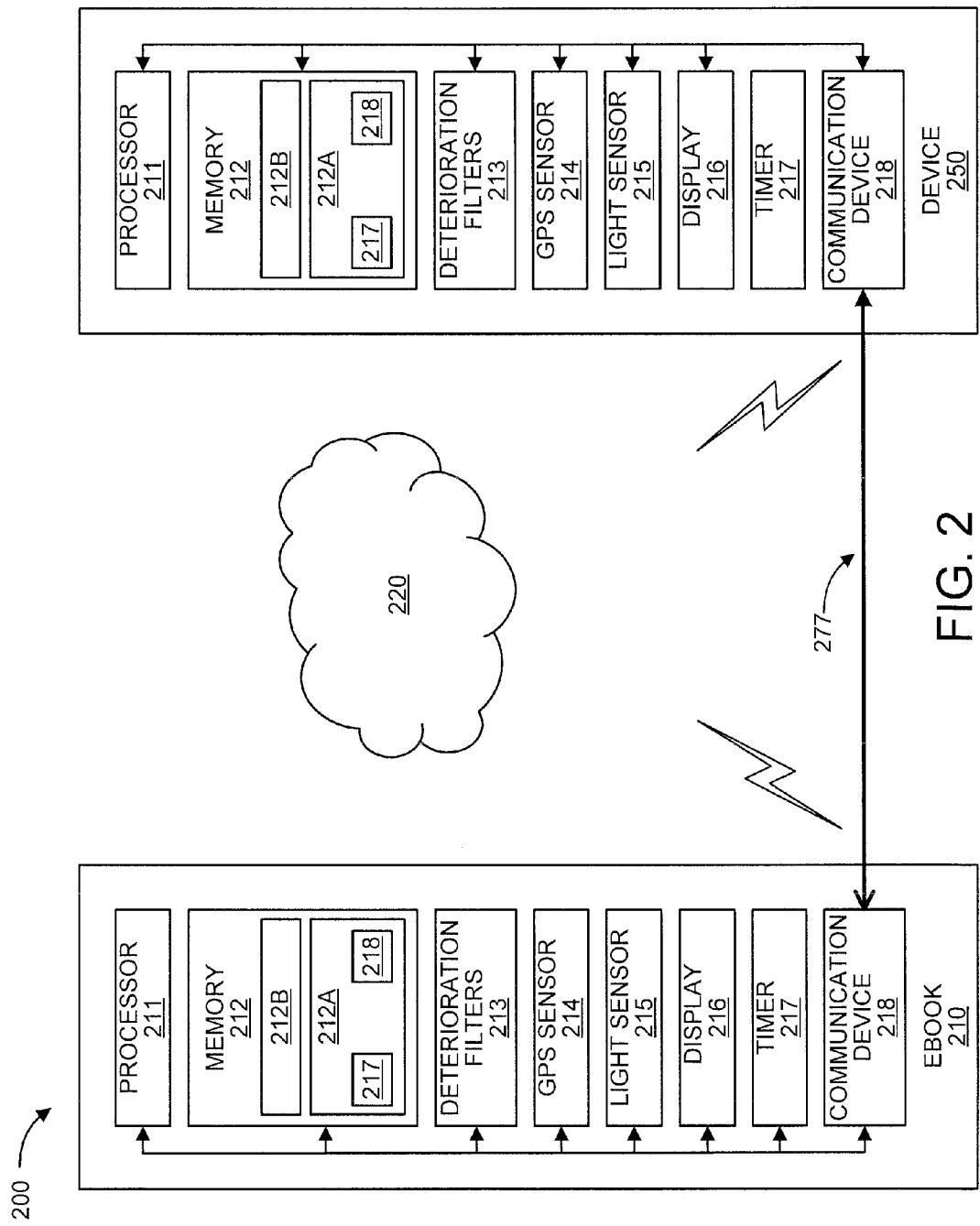
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
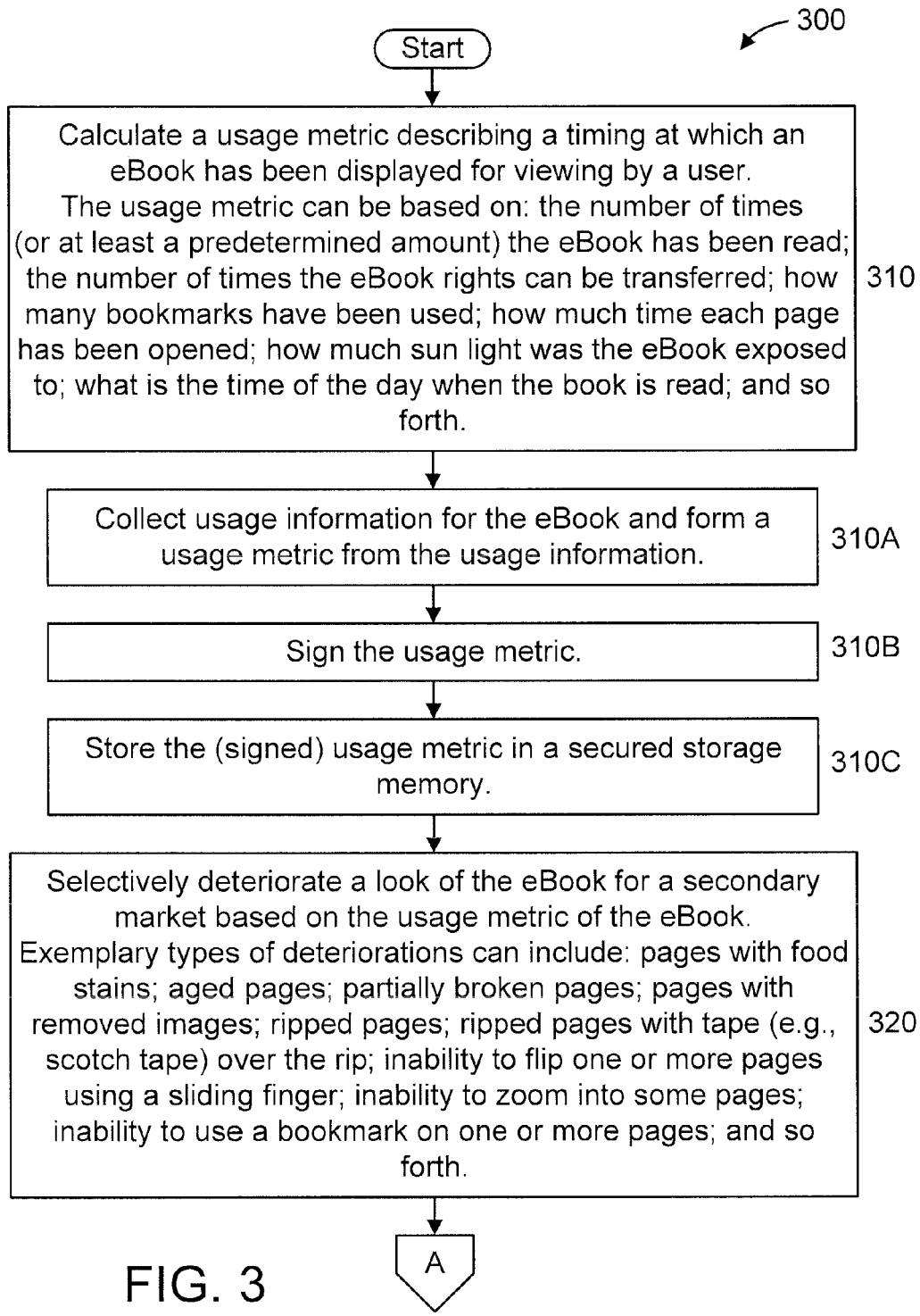
FIGS. 3-4 show an exemplary method for selectively deteriorating eBooks for the secondary market, in accordance with an embodiment of the present invention.
Figure 4:
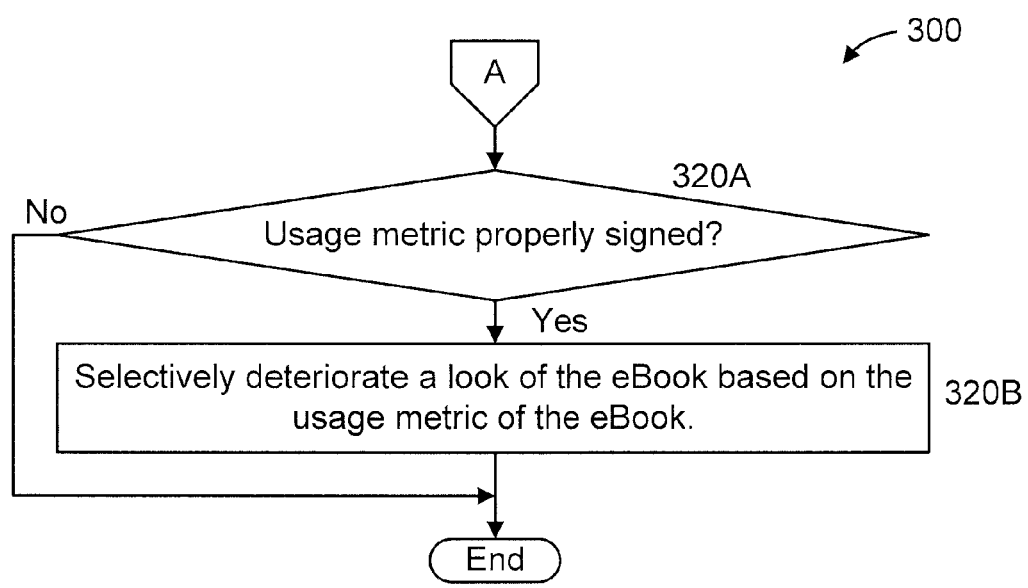
Figure 5:
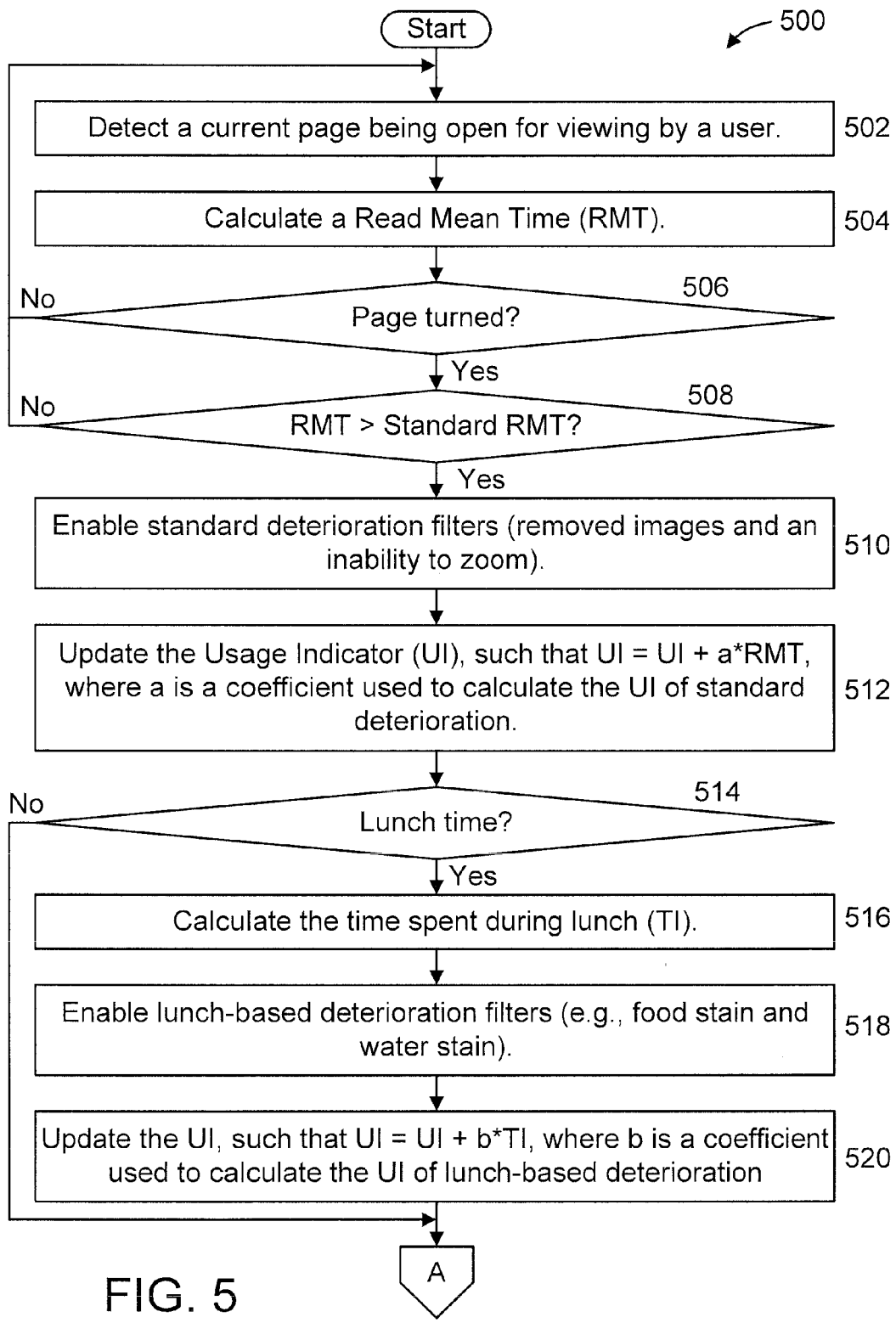
FIG. 5-8 show another exemplary method for selectively deteriorating eBooks for the secondary market, in accordance with an embodiment of the present invention.
Figure 6:
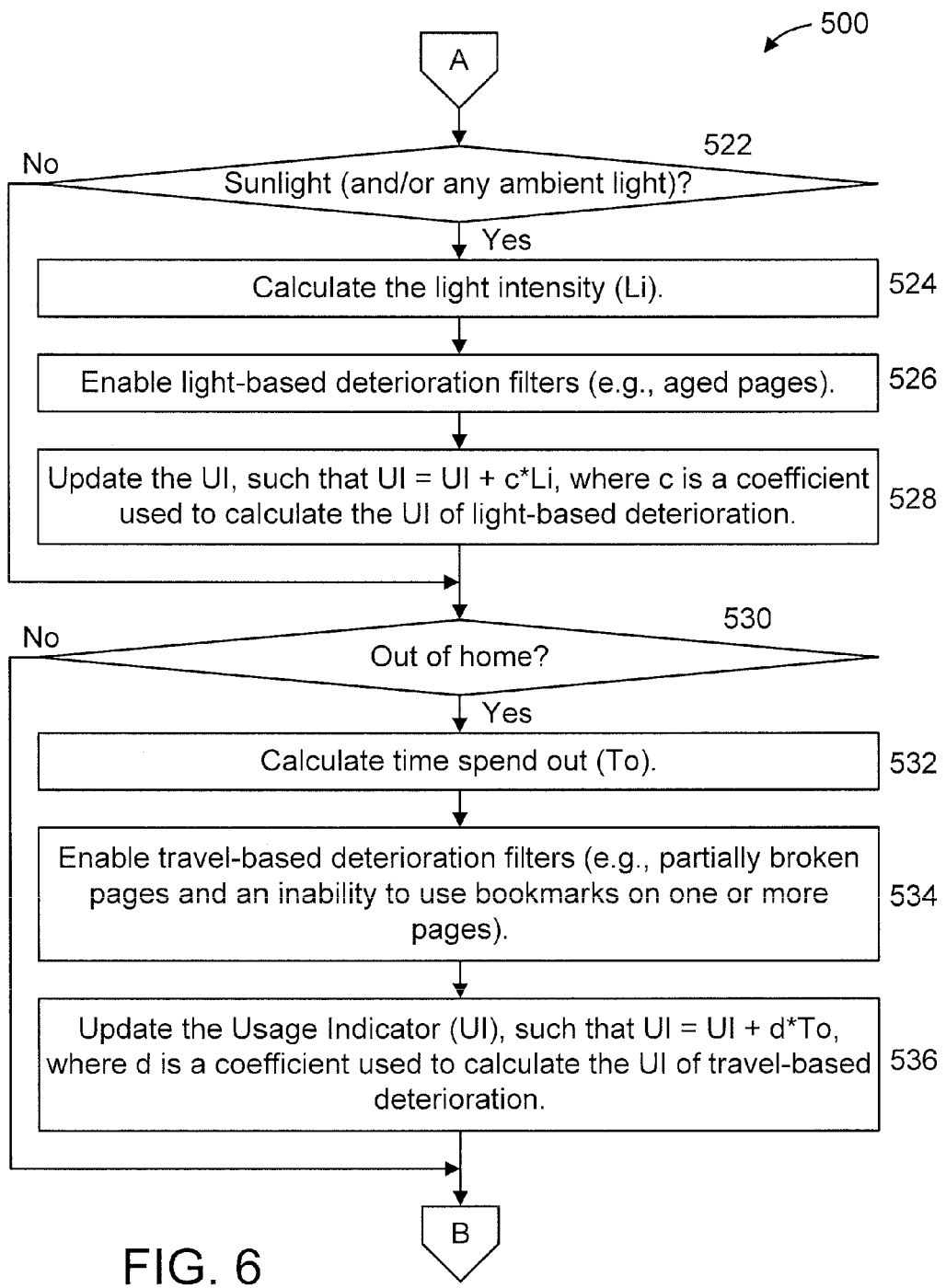
Figure 7:
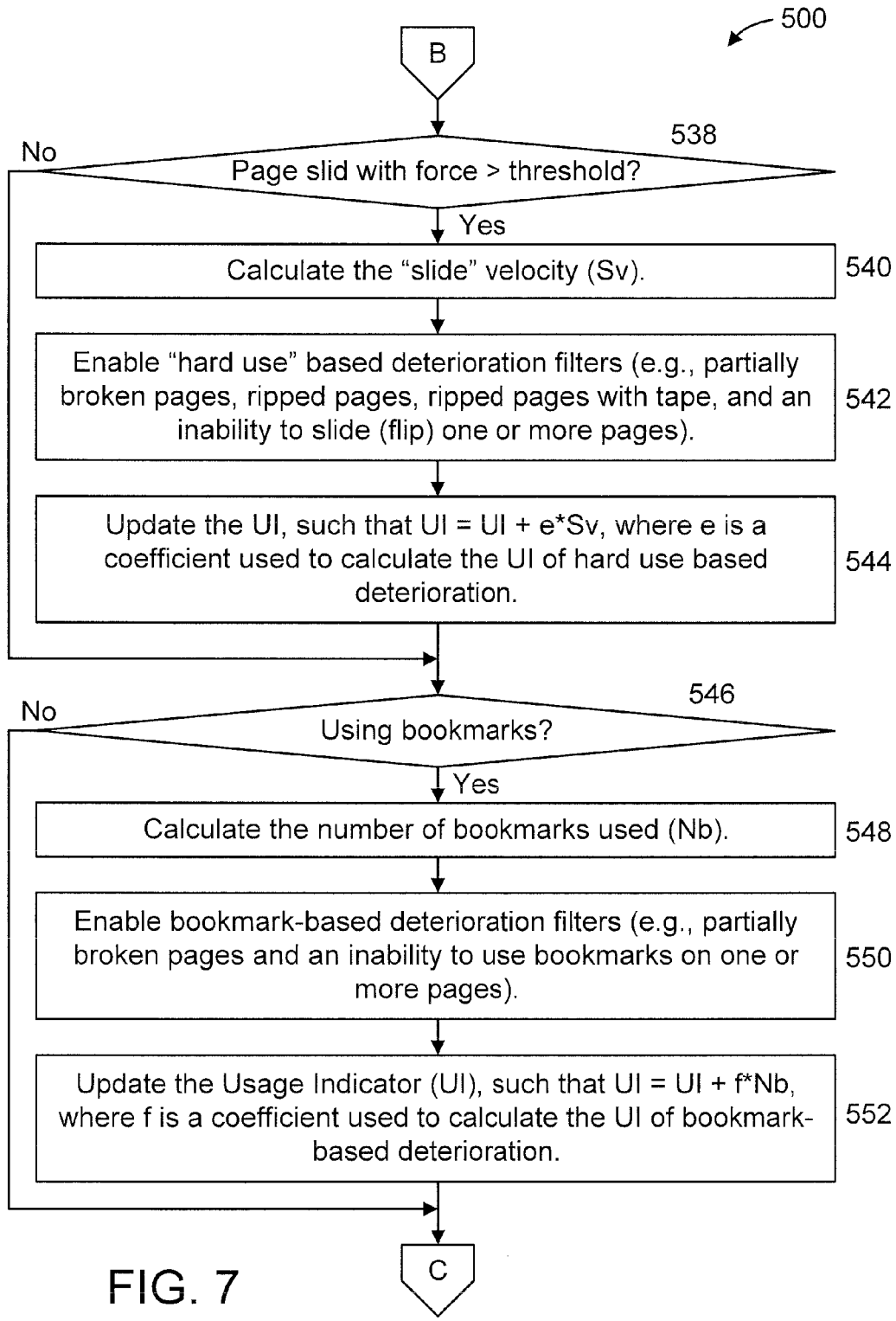
Figure 8:
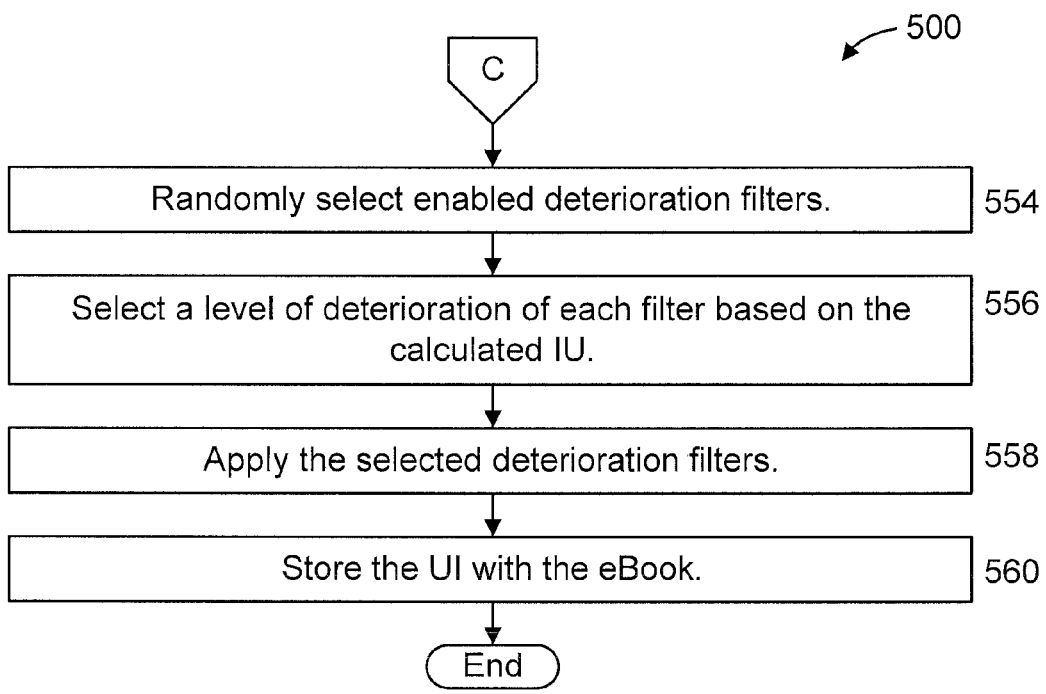

Further, it is to be appreciated that processing system 100 may perform at least part of the method described herein including, for example, at least part of method 300 of FIGS. 3-4 and/or at least part of method 500 of FIGS. 5-8. Similarly, part or all of environment 200 may be used to perform at least part of method 300 of FIGS. 3-4 and/or at least part of method 500 of FIGS. 5-8.

FIG. 2 shows an exemplary environment 200 to which the present invention can be applied, in accordance with an embodiment of the present invention.

The environment 200 can include an eBook 210, a secondary marketplace network 220, and a device 250 attachable to the eBook.

The eBook 210 and/or the device 250 attachable to the eBook includes, among other elements (not shown in FIG. 2 for the sake of brevity, and in consideration of the statement above that any of the aforementioned elements in FIG. 1 can also be in any of the elements of FIG. 2), a processor 211, a storage memory 212, deterioration filters 213, a GPS sensor 214, a light sensor 215, a touch screen display 216, a time counter (hereinafter "timer") 217, and a communication device 218.

The device 250 can connect to the eBook 210 using the communication device 218. The communication device 218 can include and/or otherwise involve/employ, for example, Universal Serial Bus (USB), micro-USB, WIFI, Bluetooth®, cellular, and so forth. That is, any known signal communication technique can be used to exchange communications between the device 250 and the eBook 210. In an embodiment, the device 250 can be implemented in a USB key or other type of device. Moreover, each of the eBook 210 and the device 250 can include and/or otherwise involve/employ more than one type of communication technology/technique. For the sake of illustration, a micro-USB cable 277 is shown in FIG. 2 connecting device 250 to eBook 210, while a wireless link 278 (e.g., WIFI, Bluetooth, cellular, etc.) is shown in FIG. 2 connecting device 250 and eBook 210 to the secondary marketplace network 220.

In an embodiment, the eBook 210 is enabled to fully include the present invention (without the use of device 250). In an embodiment, the device 250 is used to implement the present invention on eBook 210. In the embodiment of FIG. 2, both eBook 210 and device 250 are enabled to perform the present invention such that eBook 210 can implement the present invention by itself or device 250 can implement the present invention with respect to (along with) eBook 210. Thus, the following description of capabilities associated with the eBook 210 can also apply to the device 250. In yet another embodiment (see FIGS. 9-10), one or more elements of FIG. 2 can be implemented using a cloud configuration.

The storage memory 212 can include a "secured" storage memory 212A and an "unsecured" storage memory 212B. In another embodiment, the entire storage memory 212 can be "secured". The eBook context, as well as other information, can be stored in storage memory 212.

The eBook 210 is able to securely store a usage metric, embodied as "Usage Indicator" (UI) metadata 261, in the storage memory 212. Preferably, the usage metric is stored in the secured storage memory 212A, which is not accessible by external devices, in order to avoid tampering. Moreover, the eBook 210 is able to apply selected deterioration filters 213 when the eBook 210 is sold. The eBook 210 can connect with the secondary marketplace network 220 to enable the transfer of the rights to use that eBook 210 to another person on loan or permanently. In an embodiment, the Usage Indicator metadata 261 can be signed using a private key 262 available on the eBook 210. The private key 262 can also be stored in the storage memory 212. Preferably, the private key 262 is stored in secured storage memory 212A in order to avoid tampering.

The Usage Indicator metadata 261 is a collection of information needed to apply the correct deterioration filters 213 and to calculate the level of usage of the eBook 210 that can be used to estimate the selling price.

The deterioration filters 213 can apply different types of deterioration. For example, such deterioration can include, but is not limited to, adding food stains, adding age, at least partially breaking pages, removing at least one image from a page, ripping a page, adding tape to a rip on a page, making a flip function inactive/inoperable on at least one page, making a zoom function inactive/inoperable on at least one page; making at least one page incapable of being bookmarked, and so forth.

The GPS sensor 214 determines the eBook reader position.

The light sensor 215 determines the ambient light intensity.

The touch screen 216 shows the eBook content as well provides user interface elements for controlling eBook functions and to get the "slide" page velocity.

The timer 217 collects time information about the read mean time of a page, and other timing-based parameters/metrics.

The secured storage memory 212A or another on-board memory can store a time table that includes a lunch schedule and/or other user or use related information.

Thus, as noted above, the present invention can be embodied in an eBook (e.g., Ebook 210) or can be embodied in a device (e.g., device 250) that connects to an eBook in order to realize the present invention.

The device 250 could connect to an eBook 210 implemented by a normal (conventional) smartphone or tablet. The device 250 can be configured to exploit any features and sensors (e.g., GPS sensor, light sensor, etc.) already resident on the attached eBook 210, or can provide them for use if they are absent from the attached eBook 210. For example, one implementation of device 250 can be without a screen, where the user interacts with device 250 through the screen of the eBook 210 once the device 250 is connected to the eBook 210. These and other variations of the elements of FIG. 2 are readily determined by one of ordinary skill in the art given the teachings of the present invention provided herein, while maintaining the spirit of the present invention.

FIGS. 3-4 show an exemplary method 300 for selectively deteriorating eBooks for the secondary market, in accordance with an embodiment of the present invention.

At step 310, calculate a usage metric describing a timing at which an eBook has been displayed for viewing by a user. The usage metric can be based on, for example, but not limited to, one or more of the following: the number of times (or at least a predetermined amount) the eBook has been read; the number of times the eBook rights can be transferred; how many bookmarks have been used; how much time each page has been opened; how much sun light was the eBook exposed to; what is the time of the day when the book is read; and so forth.

In an embodiment, step 310 includes steps 310A-310C.

At step 310A, collect usage information for the eBook and form a usage metric from the usage information. The usage information can be collected, for example, using one or more sensors/elements such as GPS sensor 214, light sensor 215, touch screen 216, timer 217, and so forth.

At step 310B, sign the usage metric.

At step 310C, store the (signed) usage metric in a secured storage memory.

At step 320, selectively deteriorate a look of the eBook for a secondary market based on the usage metric of the eBook. Exemplary types of deteriorations can include, but are not limited to, one or more of the following: pages with food stains; aged pages; partially broken pages; pages with removed images; ripped pages; ripped pages with tape (e.g., scotch tape) over the rip; inability to flip one or more pages using a sliding finger; inability to zoom into some pages; inability to use a bookmark on one or more pages; and so forth.

In an embodiment, step 320 includes steps 320A-320B.

At step 320A, determine if the usage metric is properly signed. If so, then continue to step 320B. Otherwise, terminate the method.

At step 320B, selectively deteriorate a look of the eBook based on the usage metric of the eBook.

FIGS. 5-8 show another exemplary method 500 for selectively deteriorating eBooks for the secondary market, in accordance with an embodiment of the present invention.

At step 502, detect a current page being open for viewing by a user.

At step 504, calculate a Read Mean Time (RMT).

At step 506, determine whether or not the page was turned. If so, then proceed to step 508. Otherwise, return to step 502.

At step 508, determine whether or not the RMT is greater than a standard Read Mean Time. If so, then continue to step 510. Otherwise, return to step 502.

At step 510, enable standard deterioration filters. In an embodiment, the standard deterioration filters can cause deteriorations that include, but are not limited to, for example, removed images and an inability to zoom. In other embodiments, other types of standard deterioration filters can be used, while maintaining the spirit of the present invention.

At step 512, update the Usage Indicator (UI), such that UI=UI+a*RMT, where a is a coefficient used to calculate the UI of standard deterioration.

At step 514, determine whether or not it is lunch time. If so, then proceed to step 516. Otherwise, proceed to step 522.

At step 516, calculate the time spent during lunch (TI).

At step 518, enable lunch-based deterioration filters. In an embodiment, the lunch-based deterioration filters can cause deteriorations that include, but are not limited to, for example, food stain and water stain. In other embodiments, other types of lunch-based deterioration filters can be used, while maintaining the spirit of the present invention.

At step 520, update the Usage Indicator (UI), such that UI=UI+b*TI, where b is a coefficient used to calculate the UI of lunch-based deterioration.

At step 522, determine whether or not there is sunlight (and/or any ambient light). If so, then continue to step 524. Otherwise, continue to step 530.

At step 524, calculate the light intensity (Li).

At step 526, enable light-based deterioration filters. In an embodiment, the light-based deterioration filters can cause deteriorations that include, but are not limited to, for example, aged pages. In other embodiments, other types of light-based deterioration filters can be used, while maintaining the spirit of the present invention.

At step 528, update the Usage Indicator (UI), such that UI=UI+c*Li, where c is a coefficient used to calculate the UI of light-based deterioration.

At step 530, determine whether or not the user is out of their home. If so, then continue to step 532. Otherwise, continue to step 538.

At step 532, calculate time spend out (To).

At step 534, enable travel-based deterioration filters. In an embodiment, the travel-based deterioration filters can cause deteriorations that include, but are not limited to, for example, partially broken pages and an inability to use bookmarks on one or more pages. In other embodiments, other types of travel-based deterioration filters can be used, while maintaining the spirit of the present invention.

At step 536, update the Usage Indicator (UI), such that UI=UI+d*To, where d is a coefficient used to calculate the UI of travel-based deterioration.

At step 538, determine whether or not the page was slid with a force above a threshold amount. If so, then proceed to step 540. Otherwise, proceed to step 546.

At step 540, calculate the "slide" velocity (Sv).

At step 542, enable "hard use" based deterioration filters. In an embodiment, the hard use based deterioration filters can cause deteriorations that include, but are not limited to, for example, partially broken pages, ripped pages, ripped pages with tape, and an inability to slide (flip) one or more pages. In other embodiments, other types of hard use based deterioration filters can be used, while maintaining the spirit of the present invention.

At step 544, update the Usage Indicator (UI), such that UI=UI+e*Sv, where e is a coefficient used to calculate the UI of hard use based deterioration.

At step 546, determine whether or not the user is using bookmarks. If so, then proceed to step 548. Otherwise, proceed to step 554.

At step 548, calculate the number of bookmarks used (Nb).

At step 550, enable bookmark-based deterioration filters. In an embodiment, the bookmark-based deterioration filters can cause deteriorations that include, but are not limited to, for example, partially broken pages and an inability to use bookmarks on one or more pages. In other embodiments, other types of bookmark-based deterioration filters can be used, while maintaining the spirit of the present invention.

At step 552, update the Usage Indicator (UI), such that UI=UI+f*Nb, where f is a coefficient used to calculate the UI of bookmark-based deterioration.

At step 554, randomly select enabled deterioration filters.

At step 556, select a level of deterioration of each filter based on the calculated IU.

At step 558, apply the selected deterioration filters.

At step 560, store the UI with the eBook.

A description will now be given regarding some of the many attendant advantages of the present invention.

One advantage is that the present invention make the "used" eBook copy less attractive, selectively deteriorating the eBook in different ways depending on the "level of usage" indicator.

Another advantage is that the proposed approach combines different "deterioration" methods to obtain a "used" copy of the eBook that is unique: each copy of the same eBook can differ because different "deterioration" methods can be applied.

Yet another advantage is that beside the eBook secondary market, the present invention opens the ability to also create an "eBook ancient and collection market" where "deteriorated" copies of special ancient eBooks can be collected and traded.

Still another advantage is that it is possible to define a well suited selling price for the "used" eBook.

These and many other attendant advantages are readily contemplated by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
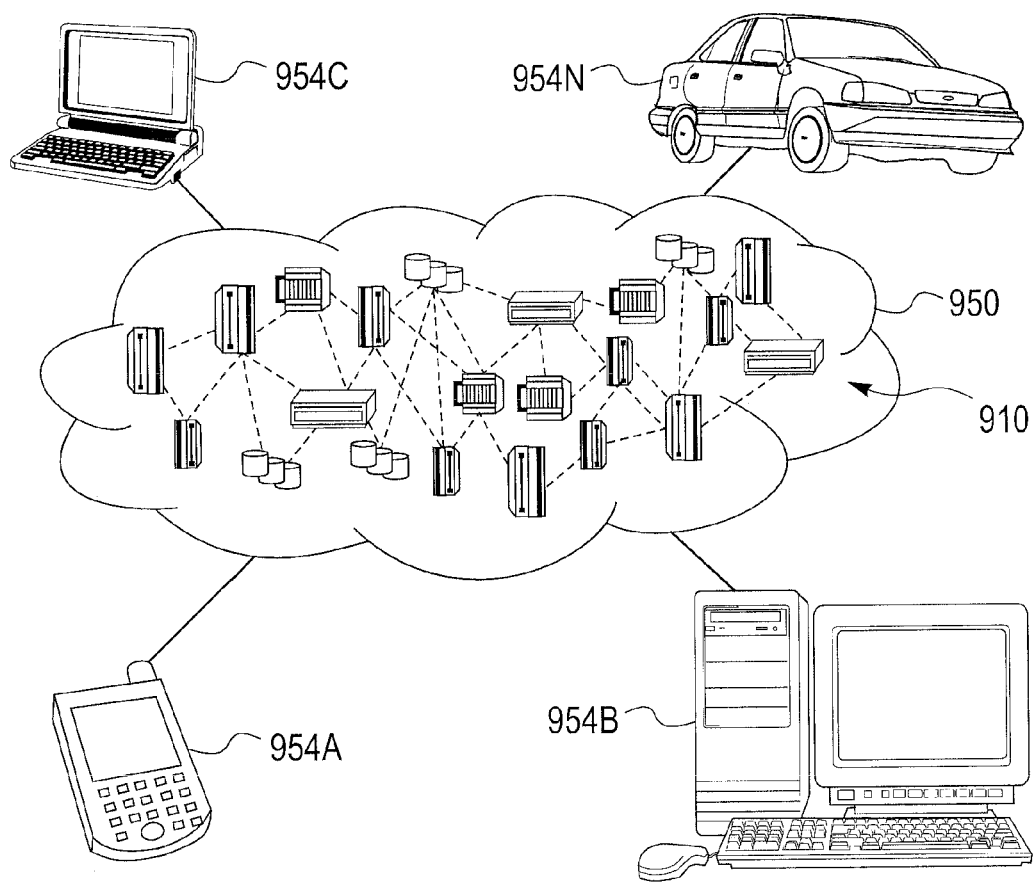
FIG. 9 shows an exemplary cloud computing environment, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
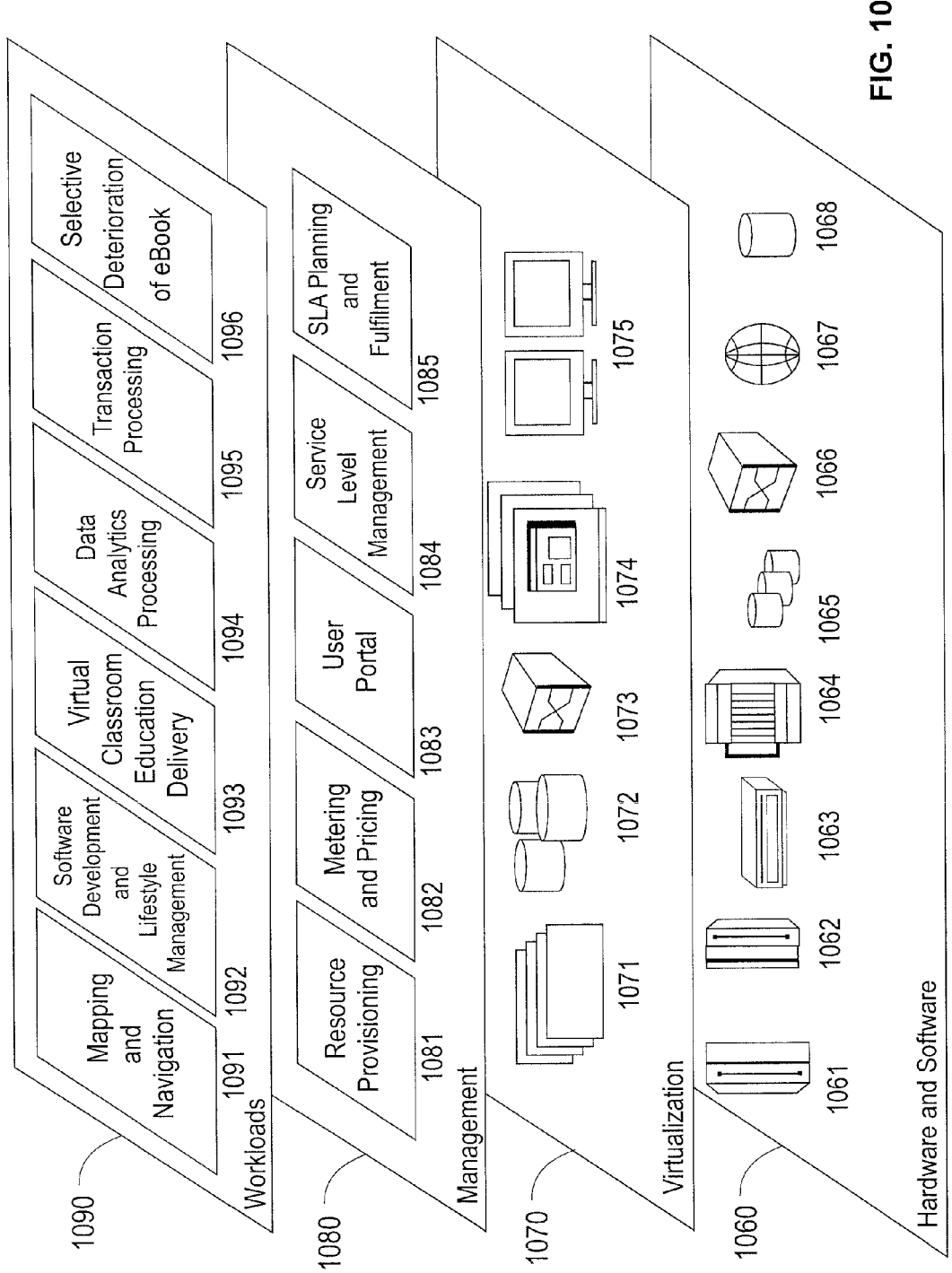
FIG. 10 shows an exemplary set of functional abstraction layers provided by the cloud computing environment shown in FIG. 9, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and selective deterioration of eBook for secondary market 1096.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
   calculating, by a processor, a usage metric describing a timing at which an eBook has been displayed for viewing by a user, the usage metric including a duration during which portions of the eBook have been displayed for viewing; and
   selectively deteriorating, by the processor, a displayed look of the eBook, presented on a display of the eBook while the display is in an activated state, for a secondary market based on the usage metric of the eBook.

2. The method of claim 1, wherein the timing corresponds to a duration during which the eBook has been displayed for viewing.

3. The method of claim 1, wherein the timing corresponds to a number of times the eBook has been displayed for viewing.

4. The method of claim 1, wherein the timing corresponds to a time of day when the eBook is viewed by the user.

5. The method of claim 1, wherein the usage metric is further based on how many bookmarks have been used for the eBook.

6. The method of claim 1, wherein the usage metric is further based on an amount of light exposure to which the eBook was subjected.

7. The method of claim 1, wherein the usage metric is further based on whether or how many times the eBook has been resold.

8. The method of claim 1, wherein said deteriorating step comprises selecting a subset of deterioration filters to apply to the eBook from a set of deterioration filters that provide different types of deterioration.

9. The method of claim 1, wherein the look of the eBook is selectively deteriorated in different ways based on the usage metric.

10. The method of claim 9, wherein the method is further applied to another copy of the eBook such that the eBook and the other copy of the eBook differ in deterioration based on the usage metric respectively corresponding thereto.

11. The method of claim 1, wherein the look of the eBook is selectively deteriorated using a deterioration selected from the group consisting of a food stain, an age-based mark, a partially inoperable page, a page with a removed image, a ripped page, a damaged page with a repair showing, an inability to page flip using a one or more page flipping motions, an inability to zoom, and an inability to use a bookmark.

12. The method of claim 1, wherein the deteriorating is based on the usage metric such that a resultant deterioration of the eBook increases with an increasing usage metric.

13. The method of claim 1, wherein an extent of a resultant deterioration of the eBook is based on how often the eBook has been resold.

14. The method of claim 1, wherein said deteriorating step comprises an action selected from the group consisting of:
 generating a look of a page having a food stain;
 generating a look of an aged page;
 generating a look of a partially broken page;
 generating a look of a page with at least one image removed from the page;
 generating a look of a ripped page;
 generating a look of a ripped page with a repair showing; and
 generating a look with at least one disabled navigation element.

15. The method of claim 14, wherein the at least one disabled navigation element is selected from the group consisting of a disabled page turn, a disabled zoom element, and a disabled bookmarking element.

16. An article of manufacture tangibly embodying a computer readable program which when executed by the processor causes a computer to perform the steps of claim 1.

17. An eBook, comprising:
 a processor, a memory, and a display, the processor being configured to:
  calculate a usage metric describing a timing at which the eBook has been displayed for viewing by a user, the usage metric including a duration during which portions of the eBook have been displayed for viewing; and
  display, using the display, a selectively deteriorated look of the eBook for a secondary market based on the usage metric of the eBook, the selectively deteriorated look being presented on the display while the display is in an activated state.

18. An apparatus, comprising:
 a communication device configured to communicate with an eBook; and
 a processor, a memory, and a display, the processor being configured to:
  calculate a usage metric describing a timing at which the eBook has been displayed for viewing by a user, the usage metric including a duration during which portions of the eBook have been displayed for viewing; and
  display, using the display, a selectively deteriorated look of the eBook, presented on the display while the display is in an activated state, for a secondary market based on the usage metric of the eBook.

19. The apparatus of claim 18, wherein the apparatus is implemented using a cloud configuration.

20. The apparatus of claim 18, wherein the apparatus is selectively attachable and detachable to and from the eBook to deteriorate the eBook on a selective basis.

* * * * *